United States Patent [19]

Rogerson

[11] Patent Number: 5,641,439
[45] Date of Patent: Jun. 24, 1997

[54] METHOD FOR BONDING THERMOPLASTIC RESINS TO OTHER MATERIALS USING SILANE DOPING

[76] Inventor: L. Keith Rogerson, No. 9 Fourth Ave., Isle of Palms, S.C. 29451

[21] Appl. No.: 534,979

[22] Filed: Sep. 28, 1995

[51] Int. Cl.⁶ .......................... B29C 44/06; B29C 41/04
[52] U.S. Cl. .......................... 264/46.4; 264/113; 264/126; 264/255; 264/311; 264/265; 427/222; 428/405
[58] Field of Search .................. 264/46.4, 45.7, 264/126, 310, 321, 311, 255, 113, 265; 156/245; 427/222; 428/405

[56] References Cited

U.S. PATENT DOCUMENTS

| | | | |
|---|---|---|---|
| 3,258,382 | 6/1966 | Vincent | 427/222 |
| 3,703,571 | 11/1972 | Roberts | 264/310 |
| 3,736,173 | 5/1973 | Okada et al. | 427/222 |
| 4,099,981 | 7/1978 | Mui et al. | 428/405 |
| 4,247,354 | 1/1981 | Ward et al. | 156/329 |
| 4,296,008 | 10/1981 | St Clair et al. | 524/271 |
| 4,684,538 | 8/1987 | Klemarczyk . | |
| 4,686,125 | 8/1987 | Johnston et al. . | |
| 4,755,251 | 7/1988 | Cline et al. | 156/315 |
| 4,762,866 | 8/1988 | Shih et al. | 523/412 |
| 4,800,125 | 1/1989 | Plueddemann | 428/405 |
| 4,826,552 | 5/1989 | Breitscheidel et al. . | |
| 4,869,966 | 9/1989 | Samuelson et al. | 428/428 |
| 4,937,284 | 6/1990 | Bergström . | |
| 4,980,112 | 12/1990 | Masters . | |
| 5,032,459 | 7/1991 | Toyoshima et al. . | |
| 5,045,393 | 9/1991 | Kumanoya et al. . | |
| 5,049,443 | 9/1991 | Kuszaj et al. | 428/332 |
| 5,094,607 | 3/1992 | Masters . | |
| 5,246,780 | 9/1993 | Farer et al. | 427/222 |
| 5,358,682 | 10/1994 | Rogerson . | |

OTHER PUBLICATIONS

Dow Corning Corporation; Information About Organofunctional Silane Chemicals; 1988.
Dow Corning Corporation; Material Safety Data Sheet for Dow Corning Z–6020 Silane; May 2, 1991.
Dow Corning Corporation; A Guide to Dow Corning Silane Coupling Agents; 1990.

Primary Examiner—Allan R. Kuhns
Attorney, Agent, or Firm—Dority & Manning, P.A.

[57] ABSTRACT

A method of bonding various materials, such as foam materials, to thermoplastic resins using a silane composition is provided. The thermoplastic resin is doped with a silane by washing the thermoplastic resin in a silane solution and then evaporating the solution from the resin. The silane-doped thermoplastic resin is then melted and formed into a polymeric article. In one embodiment, a polyurethane foam can then be sprayed onto the polymeric article. As the foam forms on the surface of the article, it bonds with silane trapped within the thermoplastic resin. In one embodiment, the polymeric article can be formed through a rotational molding technique. Through the process of the present invention, many useful articles can be formed such as polymeric pallets, water craft devices, thermocoolers and the like.

31 Claims, 2 Drawing Sheets

METHOD FOR BONDING THERMOPLASTIC RESINS TO OTHER MATERIALS USING SILANE DOPING

BACKGROUND OF THE INVENTION

The present invention is generally directed to a method of bonding various materials such as foam materials to polymeric materials and to articles made therefrom. More particularly, the present invention is directed to a method of bonding foam materials to thermoplastic polymers using silane containing compounds.

Many useful articles are constructed by bonding foams to various structural materials. The foam can be incorporated into the product in order to provide thermal insulation, to provide insulation from noise, to act as a filler, to increase the structural integrity of the article, or for many other various reasons. In the past, when bonding foams to plastic materials, the foams have been primarily used with thermosetting polymers and with composite polymers such as fiberglass. Unfortunately, thermoset plastics are difficult to recycle once used.

In many foam and polymer applications, it would be very desirable to replace the non-recyclable plastics with recyclable materials, such as thermoplastic polymers. In the past, however, many difficulties have been encountered in sufficiently bonding the foam materials to the thermoplastic resins. The prior art teaches using cross-linking agents such as peroxides to form the bond. The cross-linking agents, however, render the polymers non-recyclable, thus removing one of the primary advantages of using them.

For instance, one prior art construction is directed to a process for the production of multi-layer moldings from a substrate member. The process includes bonding an elastomer foam to polypropylene containing a cross linking agent. The cross-linkable polypropylene and elastomer foam are combined and compression molded and then stored under hot conditions in order to increase the degree of cross-linking. As discussed above, however, cross-linking agents can render a thermoplastic resin thermoset in character making the polymer very difficult to recycle.

Generally speaking, the present invention is directed to a method for bonding various materials especially foam materials to thermoplastic polymers without using cross-linking agents. In particular, a silane compound is used for bonding a foam to the polymer. Unexpectedly, through the process of the present invention, no cross-linking agents, such as peroxides, are necessary for establishing a bond between the foam and the polymer. As shown in the accompanying figures, the method of the present invention can be used to construct watercrafts, pallets, thermocoolers, and many other useful articles.

SUMMARY OF THE INVENTION

The present invention recognizes and addresses various disadvantages of prior art constructions and methods. Accordingly, it is an object of the present invention to provide a method for bonding various materials to thermoplastic polymers.

It is another object of the present invention to provide articles made from foam materials bonded to thermoplastic polymers.

Still another object of the present invention is to provide a method of bonding foam materials to thermoplastic polymers using silane compounds.

Another object of the present invention is to provide a method of bonding a polyurethane foam to a polyolefin.

It is another object of the present invention to provide a method for rotationally molding thermoplastic polymers that have been doped with a silane compound for later bonding with foam materials.

Still another object of the present invention is to provide a layered polymeric article that includes an exterior layer adapted to be bonded with foam materials that is made from a silane-doped thermoplastic resin.

These and other objects of the present invention are achieved by providing a method of making polymeric and foam articles. The method includes the steps of washing thermoplastic resin particles with a silane solution. The silane solution can contain from about 0.1% to about 20% silane. The solution can also contain an alcohol having a neutral to basic pH. After washing, the thermoplastic resin particles are dried, evaporating the silane solution and causing a silane to be deposited upon the particles.

The silane-doped thermoplastic resin particles can then be heated and molded into a shaped article. After cooling, a foam material can be bonded to the shaped article as desired.

In one embodiment, the foam material bonded to the shaped article is a polyurethane foam. The polyurethane foam can be formed directly on the shaped article by reacting a polyol with an isocyanate. It is believed that while the polyurethane is forming it simultaneously bonds with the silane contained within the thermoplastic resin.

In another embodiment, the polymeric shaped article can comprise multiple layers of polymeric materials. The silane-doped thermoplastic resin is used to form at least one surface on the shaped article adapted for later bonding with the foam material.

These and other objects of the present invention are also achieved by providing a method of making polymeric and foam articles using a rotational molding technique. According to this method, a mold having an interior surface is first loaded with a predetermined amount of a polymeric material. The amount of the polymeric material added to the mold should be sufficient to cover substantially the entirety of the interior surface. Once loaded with the polymeric material, the mold is heated and rotated causing the polymeric material to melt and distribute over the interior surface.

The mold is then further loaded with a silane-doped thermoplastic resin while the mold is at a temperature sufficient to melt the resin. Rotation of the mold is continued in a manner such that the silane-doped resin is distributed over at least a portion of the polymeric material forming an inner layer. The molded polymeric article is then cooled and bonded to a foam material. In particular, the foam material, which can be a polyurethane foam, is bonded to the inner layer comprised of the silane-doped thermoplastic resin.

Alternatively, the silane-doped thermoplastic resin can be first added to the mold followed by the polymeric material. In this embodiment, the silane-doped thermoplastic resin forms an outer layer on the resulting polymeric article. This outer layer is then adapted for bonding with the foam material.

Other features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
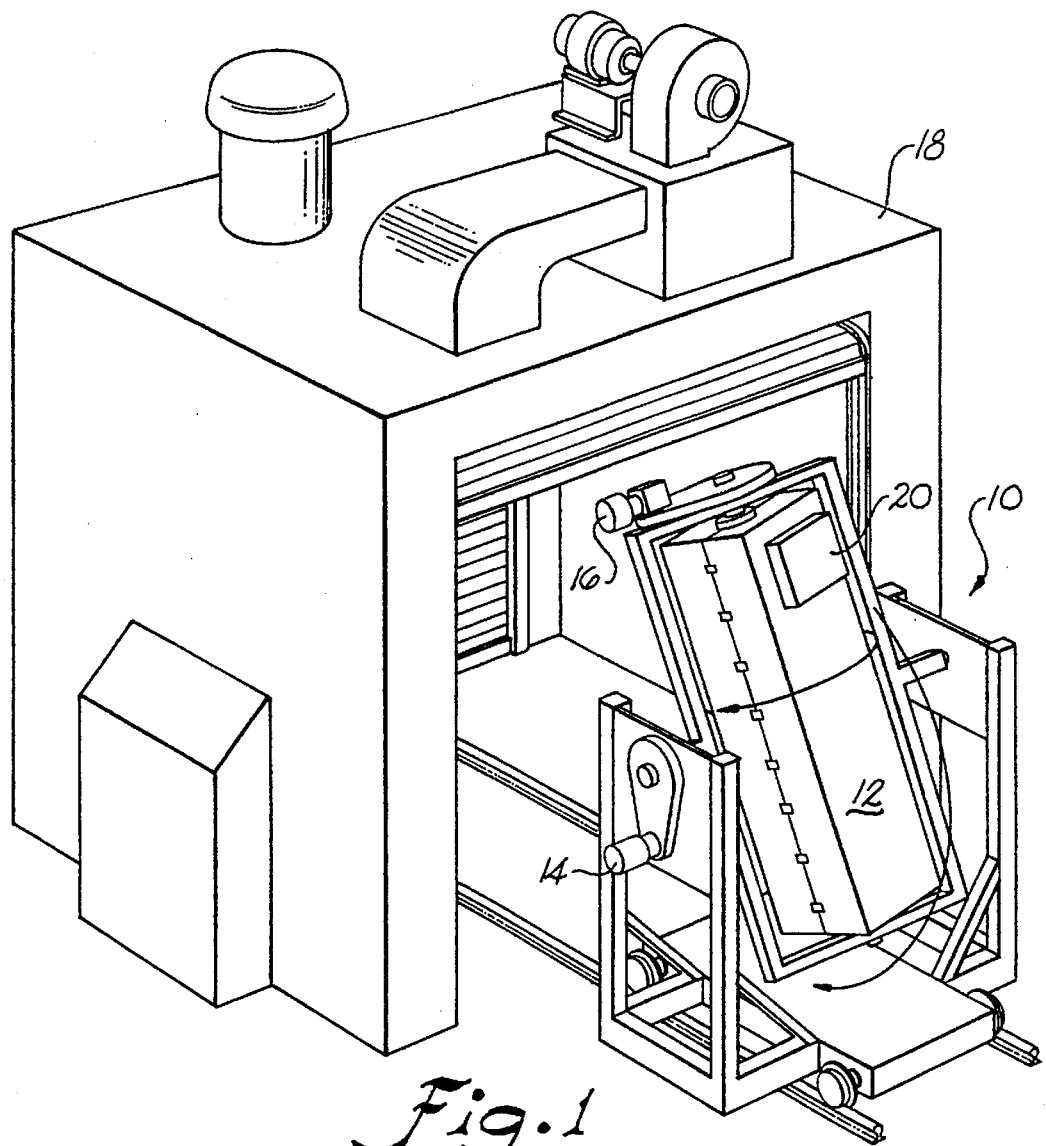
FIG. 1 is a perspective view of a rotational molding machine that can be used in the process of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended to limit the broader aspects of the present invention, which broader aspects are embodied in the exemplary construction.

The present invention is generally directed to a method of bonding various and different materials such as foam materials to recyclable thermoplastic resins. The present invention is also directed to various polymer and foam articles made according to the above method. More particularly, according to the process of the present invention, a thermoplastic resin is doped with a silane compound. The silane-doped thermoplastic resin is then molded into an article. A different material, such as a polyurethane foam, is then bonded to the article for any desired reason.

As described above, the foam material is bonded to the thermoplastic resin without using a cross-linking agent, such as a peroxide. When cross-linking agents are employed, the thermoplastic resins take on thermoset properties and are no longer easily recyclable. In the present invention, however, the foam materials are bonded to the thermoplastic resins without the resins losing their thermoplastic characteristics.

The resulting polymer and foam articles are lightweight but have substantial structural integrity. Products that can be made according to the process of the present invention include watercrafts, polymeric pallets, polymeric furniture, insulated storage tanks, thermocoolers, children's toys, and many other various items.

Describing the process of the present invention in more detail, first a polymeric material, namely a thermoplastic polymer, is doped with a silane. As used herein, a silane refers to any compound that contains silicon. Preferably, the silane compound used in the present invention is an organosilane having the following general formula:

$$R—SiX_3$$

wherein R is an organofunctional group and X is a hydrolyzable group that may convert to silanol on hydrolysis. In some embodiments, R can include a propylene group bonded to various other groups such as chlorine, a methacrylate group, or an amino group.

The X in the above formula, on the other hand, is typically an alkoxy group such as a methoxy group. Preferably, the $SiX_3$ group is a trimethoxysilane.

Commercially available silane coupling agents that can be used in the process of the present invention can be obtained from Dow Corning Corporation, located in Midland, Mich. One preferred silane coupling agent available from Dow Corning Corporation is N-(2-aminoethyl)-3-aminopropyltrimethoxysilane which has the following chemical formula:

$$NH_2CH_2CH_2NH(CH_2)_3Si(OCH_3)_3$$

As stated above, the chosen silane compound is used as a dopant in being combined with a thermoplastic resin. As used herein, a silane-doped thermoplastic resin refers to a thermoplastic resin that has been treated with a silane compound. Generally, any thermoplastic resin may be used in the process of the present invention. In particular, polyolefins such as homopolymers and copolymers of polypropylene, polyethylene, polybutylene or mixtures thereof, or vinyl polymers such as polyvinyl chloride or a polystyrene may be used. The particular polymer chosen for use in the present invention will depend upon the particular article being made and the physical characteristics that are desired.

In order to dope the thermoplastic polymer with the silane compound, in one embodiment, the thermoplastic resin can be washed with a silane solution and then dried. More particularly, the thermoplastic resin is first provided in the form of small particles. For instance, although not critical, the particles can be between about 20 to about 50 mesh, and preferably around 35 mesh in size. The particles are then washed with an aqueous silane solution. As used herein, washed refers to immersing the particles in the solution such as by dipping, spraying or the like. For instance, in one embodiment, the thermoplastic particles can be placed in a mixer and mixed with excess silane solution.

Silane compounds are typically commercially available in either a dry form or as a concentrate. It has been found that when used in the present invention, it is preferable to place the silane in an aqueous solution prior to application to the thermoplastic polymers. As opposed to a powder or a concentrate, silane solutions are easier to handle and are easier to mix with the thermoplastic resins.

The silane solution used in the present invention contains from about 0.1% to about 30% by volume silane and preferably contains about 5% silane. The remainder of the solution can comprise water or can include water and a stabilizer. Preferably, the stabilizer is a neutral to basic alcohol, such as isopropyl alcohol or etherglycol. When present, the stabilizer can be added in amount from about 5% to about 10% by volume.

After washing the polymeric particles in the silane solution, the silane solution is drained and the thermoplastic particles are dried. For instance, after draining the silane solution, the particles can be placed on a piece of water absorbent cloth and air dried or placed in an oven. In an alternative embodiment, the particles can be centrifuged and then dried in a vacuum. Regardless, the solution should be substantially evaporated from the particles. When evaporation is substantially complete, silane remains coated upon the particles.

After the thermoplastic particles are doped or coated with silane, the thermoplastic particles can then be heated and molded into a shaped article. More particularly, the silane-doped thermoplastic resin is preferably heated to a temperature sufficient to melt the resin but insufficient to degrade the resin. For instance, when using polyethylene the thermoplastic resin is preferably heated to at least 270° F. Once melted, the thermoplastic resin can then be, for example, injection molded or rotationally molded into a shaped article.

Once molded to a particular shape, the thermoplastic resin is then preferably cooled (for instance, below about 125° F.). Silane remains on the surface of the shaped article and provides reactive sights for bonding with various materials such as foam materials. It has been found, that after melting and hardening the resin, the silane groups become much more amenable to reaction with a foam material for bonding the foam material to the polymer. The reasons for this phenomenon, thus far, remain unknown.

In one embodiment, the silane-doped thermoplastic resin can be heated and bonded as an exterior layer to another polymeric material. For instance, a polymeric material, such as a thermoplastic resin, not doped with a silane, can be molded into an article of any particular shape. A silane-doped thermoplastic resin can then be heated and melt bonded to a portion of the polymeric article. The silane-doped thermoplastic resin thus acts as a tie layer between a foam material and the polymeric article.

For instance, in one embodiment, a layered polymeric product can be made using a rotational molding technique. Various embodiments of rotational molding apparatus that may be used in the present invention are disclosed in U.S. Pat. No. 5,358,682 which is incorporated herein in its entirety by reference thereto, and in which the present inventor is also the listed inventor.

Referring to FIG. 1, another embodiment of a rotational molding apparatus generally 10 is illustrated. Rotational molding apparatus 10 includes a mold that, as shown by the arrows, can be rotated about two different axes. In particular, rotational molding apparatus 10 includes a first motor 14 for rotating mold 12 about the X axis and a second motor 16 for rotating mold 12 about the Y axis. Rotational molding apparatus 10 further includes a drop box 20 which will be described in more detail hereinafter.

When rotational molding apparatus 10 is used according to the process of the present invention, a charge of polymeric material is first loaded into mold 12. Rotational molding apparatus 10 is then wheeled into an oven 18 and heated while mold 12 can be rotated about the Y axis and/or the X axis. Mold 12 is heated to a temperature sufficient to cause the polymeric material contained therein to melt and distribute over the inside walls of the mold.

Once the polymeric material has distributed within mold 12, a silane-doped thermoplastic resin contained in drop box 20 can be released into the mold. The silane-doped thermoplastic resin similarly melts and distributes over the inside surface of the polymeric material. When melted and distributed in this manner, the silane-doped resin melt bonds with the polymeric material to form a coherent structure.

Drop box 20 is opened releasing the silane-doped resin at about midpoint through the cycle of melting and distributing the charge of polymeric material. For instance, in one embodiment, a non-doped polyethylene resin can be initially placed in mold 12. Mold 12 can be rotated about two axes and heated to at least 270° F. in order to melt and distribute the polyethylene. Generally, it takes about 15 minutes to melt and distribute polyethylene over a mold as shown in FIG. 1. Under such circumstances, drop box 20 containing a silane-doped thermoplastic resin can be opened releasing the resin into mold 12 midway through the heating cycle (at about the 8 minute mark). The silane-doped thermoplastic resin then melts and distributes over the interior surface of the polyethylene.

Once the silane-doped thermoplastic resin is melted and distributed over the polyethylene, the layered article can be cooled and removed from mold 12. The inner layer of the article made from the silane-doped thermoplastic resin provides a surface for bonding with foam materials. For example, a polyurethane foam can be formed upon and bonded with the silane-doped resin as will be described in more detail hereinafter.

In most applications, the foam material is preferably bonded with the inner surface of the molded article. However, in alternative embodiments, the foam material may need to be bonded to the outer surface of the article. In these instances, the silane-doped thermoplastic resin can initially be added to mold 12 and drop box 20 can contain a charge of a polymeric material that has not been doped with the silane compound. Thus, the resulting molded article will include an outer layer of silane-doped resin for bonding with a foam material and an inner layer comprised of the polymeric material.

Of course, any type of layered product may be produced according to the process of the present invention. For instance, multilayered articles may also be molded for later bonding with a foam material. Further, the silane-doped thermoplastic resin can be melt bonded to a molded polymeric article at any location for providing a foam-bonding surface.

Layered polymeric articles adapted for bonding with foam materials provide certain benefits and advantages over molded articles made exclusively from the silane-doped thermoplastic resin. For instance, other layers of non-doped polymeric material can be added to the molded article for aesthetic reasons or for providing strength to the final product. Also, the polymeric resin not doped with a silane compound is generally more economical to incorporate into the product than if the product were made exclusively from the silane-doped resin. Further, generally speaking, silane-doped thermoplastic resins do not melt and distribute over a mold as easily as pure resins.

Whether formed through rotational molding, injection molding or any other means, once a polymeric article is formed containing a silane-doped thermoplastic polymer, according to the present invention a dissimilar material such as a foam material can then be bonded to the article as desired. Specifically, the foam material is bonded to a surface of the article comprised of the silane-doped polymer. The silane contained within the polymer acts as a coupling agent between the polymer and the foam.

Although it is believed that other foam materials may be bonded to the silane-doped thermoplastic resin, preferably a polyurethane foam is used. Polyurethanes are versatile polymers that can be used in forming foam products with a wide range of hardnesses and densities.

Polyurethane foams are typically made by reacting two major chemical components together that are metered and mixed in a preselected ratio. The two major chemical components mixed to produce the foam are a polyol and an isocyanate. Other ingredients can be added as needed for producing a specific type of foam. These other additives may include water, auxiliary blowing agents, catalysts, fillers, coloring agents, and surfactants.

The polyol that is used to make polyurethane foams is typically a diol. For instance, in one embodiment, the polyol can be a copolymer of ethylene glycol and adipic acid. The isocyanate used to make the foam, on the other hand, is typically a diisocyanate. One example of a commercially available polyurethane foam that may be used in the process of the present invention can be obtained from Flexible Products Company located in Marietta, Ga. Specifically, the foam product is made by combining a polyol component with an isocyanate component. It is believed that the isocyanate used is a diphenyl methane diisocyanate.

Polyurethane foams are generally formed using a spraying method or a pouring method. Spraying, which is generally used to produce rigid foams, refers to a process by which the chemical reactants are mixed and sprayed onto a surface where the foaming reaction occurs. In the pouring method, the reactants are dispensed and mixed in an open cavity or in a closed mold where the reaction take place and the foam is formed.

When using a polyurethane foam in the process of the present invention, the foam may be formed upon the polymeric article. While the foam is forming, the foam then reacts and bonds to the silane contained within the thermoplastic polymer.

For example, in one embodiment, a liquid resin containing a polyol and a liquid isocyanate initiator can be kept in separate tanks under a nitrogen blanket. The two components can then be shot out through a hose onto or into the formed polymeric article. Although, the amounts will depend upon the particular polyurethane foam used, the polyol resin and the isocyanate can be mixed and dispensed onto the polymeric article in about a one to one ratio. Once the components are applied to the polymeric article, a polyurethane foam will form that simultaneously bonds to the silane-doped thermoplastic polymer.

Of particular advantage, the foam can be formed and bonded to the polymeric article at lower temperatures, below 100° F. Thus far, it has been found that the foam will adequately form and bond to the polymeric article at temperatures between about 65° F. to about 85° F. and preferably at about 80° F.

Besides foam materials, the silane doping process of the present invention can also be used to bond other various materials to thermoplastic resins. Generally speaking, any material that reacts and bonds with silane can be coupled to the silane-doped thermoplastic resin. More particularly, it is believed that many thermosetting polymers can be bonded to a silane doped thermoplastic resin made in accordance with the present invention. For instance, it is believed that the silane doped thermoplastic resin will bond to epoxies, phenolics, melamines, nylons, polyvinyl chloride, acrylics, urethanes, non-foam polyurethanes, nitrile rubbers, polyesters, polysulfides and others.

When bonding thermosetting polymers and other similar types of materials as listed above to a silane doped thermoplastic resin, preferably the dissimilar material is formed on the surface of the silane doped thermoplastic resin and bonded therewith similar to the process described above using polyurethane foams. Depending upon the material being bonded to the silane doped resin, heat may need to be supplied in order to get the materials to bond together or in order to form the non-doped material.

Many advantages can be realized when bonding thermoplastic resins, especially polyolefins, to different materials, such as thermosetting polymers, rubber-type materials, and other various non-foam materials. For instance, it is now possible through the process of the present invention to coat an article made from a thermosetting polymer with a polyolefin or to coat an article made from a polyolefin with a thermosetting polymer.

Many varieties and types of useful articles can be formed according to the above described process. For instance, articles for use in the building and construction field can be formed, furniture and furniture parts can be constructed, articles for use in motor vehicles can be made, and insulated panels for refrigeration units can be made.

Figure 2:
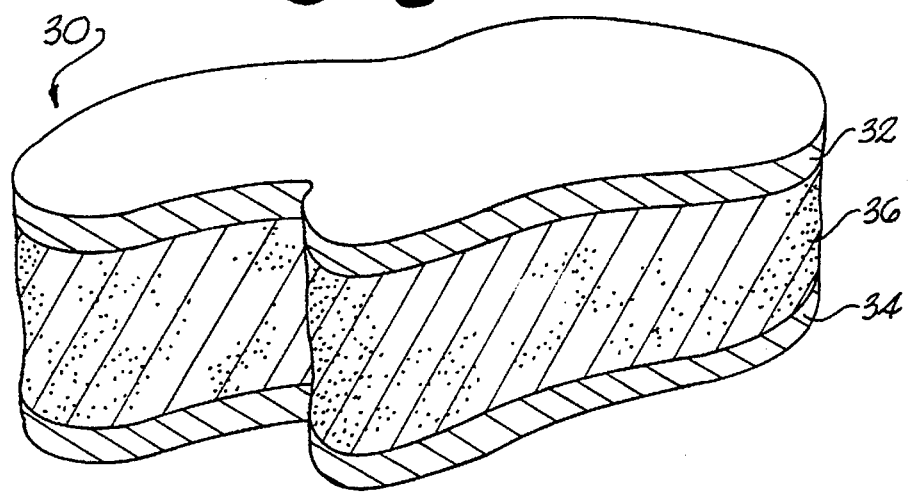
FIG. 2 is a perspective view of a polymeric article made in accordance with the present invention.

For exemplary purposes only, FIG. 2 illustrates a layered polymeric and foam article generally 30 that can be made in accordance with the present invention. Article 30 includes a layer of foam material 36 sandwiched between a first layer of polymeric material 32 and a second layer of polymeric material 34. Preferably, foam material 36 is a polyurethane foam while first layer 32 and second layer 34 are made from a thermoplastic polymer. In particular, layers 32 and 34 can be made exclusively with a silane-doped thermoplastic resin or can be made from a mixture of various polymers as long as the inner surface in contact with foam material 36 is doped with a silane compound.

A polymer and foam article as exemplified by FIG. 2 can be used in a variety of applications. The foam and polymer structure can be used as an insulator or can be used for its structural strength. In particular, such articles have a high strength to weight ratio and display a greater rigidity than solid parts of the same material and equal weight.

Figure 3:
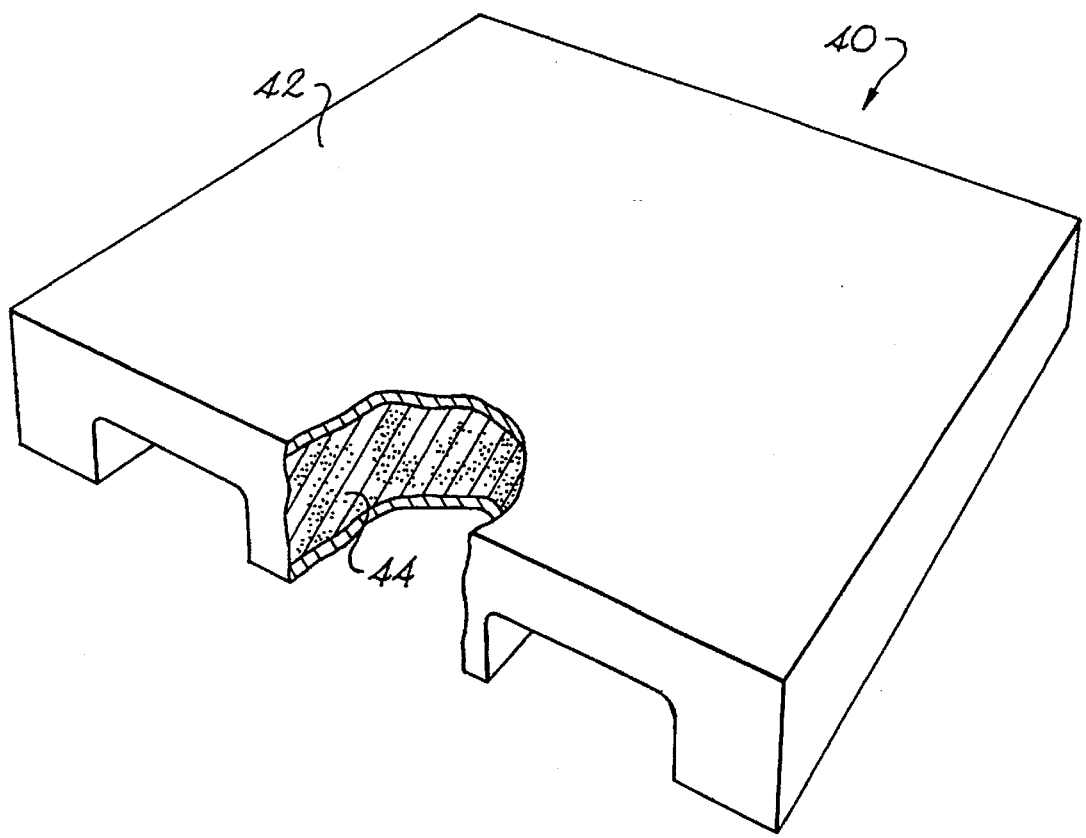
FIG. 3 is a perspective view with cut away portions of a foam reinforced polymeric pallet made in accordance with the present invention.

Referring to FIG. 3, a specific article that can be made according to the process of the present invention is a polymer and foam pallet generally 40. Pallet 40 includes a shell of polymeric material 42 bonded to an interior layer of foam 44. Again, foam 44 is securely bonded to the interior surface of polymeric shell 42 through the use of a silane coupling agent.

In a preferred embodiment, outer shell 43 of pallet 40 is made from a silane-doped thermoplastic resin. The thermoplastic resin provides structural support and is completely recyclable. In fact, as stated above, foam material 44 is bonded to shell 42 without the use of a cross-linking agent. Thus, shell 42 retains its thermoplastic characteristics. Further, by having shell 42 securely bonded to foam layer 44, a coherent, lightweight and structurally sound article is produced.

Figure 4:
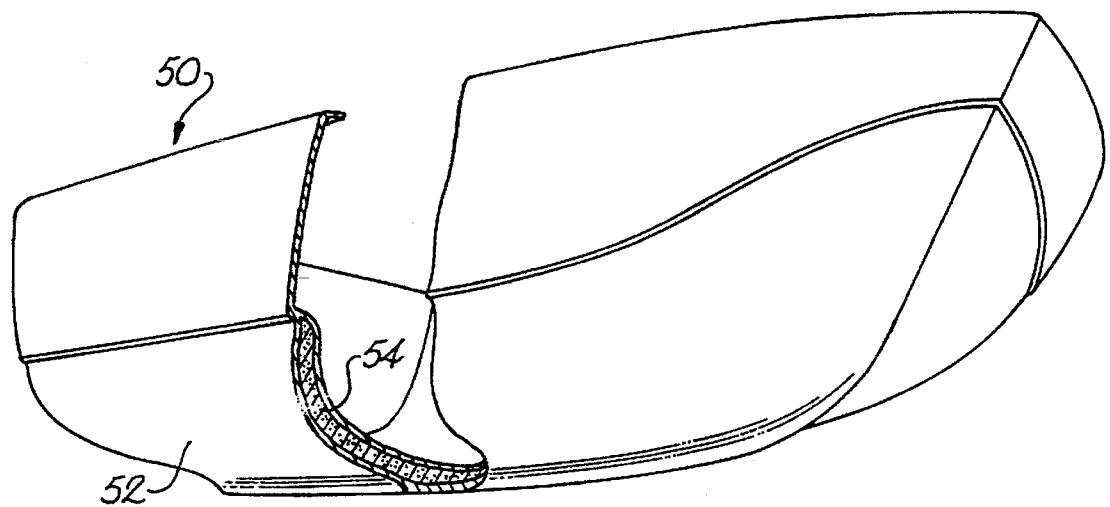
FIG. 4 is a perspective view with cut away portions of a watercraft made in accordance with the present invention.

Referring to FIG. 4, another article of manufacture, a watercraft or boat generally 50, that can be made in accordance with the present invention is illustrated. Boat 50 includes a hull 52 made solely from thermoplastic polymers. As shown, at least a portion of the inside surface of hull 52 is made form a silane-doped thermoplastic polymer which is bonded to a foam material 54 such as a polyurethane foam. When incorporated into boat 50, foam material 54 not only provides structural integrity to the hull but also provides noise insulation when the boat is moving through the water.

Currently, boats and various watercrafts such as illustrated in FIG. 4 are made using fiberglass. Fiberglass, however, is not currently recyclable and is difficult to dispose of. As such, a boat, or watercraft, as constructed in FIG. 4 provides various advantages and benefits not before realized.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method of doping polymeric materials with a silane, said method comprising the steps of:

washing a thermoplastic resin with a silane solution;

drying said thermoplastic resin;

heating said thermoplastic resin to a temperature sufficient to melt said resin; and molding said melted resin into a polymeric article, such that said article has at least one surface comprised of silane-doped thermoplastic resin, said at least one surface being adapted for bonding with different materials.

2. A method as defined in claim 1, wherein said silane solution comprises from about 0.1% to about 20% silane.

3. A method as defined in claim 2, wherein said silane solution further comprises an alcohol having a neutral to basic pH, said alcohol being present in said solution in an amount from about 5% to about 10% by volume.

4. A method as defined in claim 1, wherein said silane solution contains a silane compound having the following formula:

wherein R is an organofunctional group and X is an alkoxy group.

5. A method as defined in claim 4, wherein said silane compound is a trimethoxysilane.

6. A method as defined in claim 1, wherein said thermoplastic resin is a homopolymer or copolymer of a polyolefin.

7. A method as defined in claim 1, further comprising the step of molding said silane-doped thermoplastic resin into a polymeric article comprised of multiple layers of polymeric materials, said silane-doped thermoplastic resin forming at least one exterior surface on said article.

8. A method as defined in claim 1, wherein said silane-doped thermoplastic resin is rotationally molded into said polymeric article.

9. A method as defined in claim 1 wherein said thermoplastic resin is a polyethylene.

10. A method of making polymeric and foam articles, said method comprising the steps of:
    washing thermoplastic resin particles with a silane solution;
    drying said thermoplastic resin particles for evaporating liquids contained in said silane solution while depositing silane upon said particles;
    heating and molding said thermoplastic resin particles into a shaped article;
    cooling said shaped article for hardening same; and
    bonding a foam material to said shaped article for producing a polymeric and foam article.

11. A method as defined in claim 10, wherein said silane solution comprises from about 0.1% to about 20% silane, said silane having the following formula:

wherein R is an organofunctional group and X is an alkoxy group.

12. A method as defined in claim 11, wherein said silane solution further comprises an alcohol having a neutral to basic pH.

13. A method as defined in claim 10, wherein said silane-doped thermoplastic resin is heated and rotationally molded into said shaped article in a manner such that said silane-doped thermoplastic resin forms at least one exterior surface on said shaped article adapted for bonding with said foam material.

14. A method as defined in claim 10, wherein said foam material comprises a polyurethane foam.

15. A method as defined in claim 14, wherein said polyurethane foam is formed directly on a surface of said shaped article by combining and reacting a polyol with an isocyanate.

16. A method as defined in claim 15, wherein said polyurethane foam is formed on said surface at a temperature less than 100° F.

17. A method as defined in claim 10, wherein said thermoplastic resin comprises a polyolefin.

18. A method of making polymeric and foam articles, said method comprising the steps of:
    loading a predetermined amount of a polymeric material into a mold having an interior surface, said amount of said polymeric material being sufficient to cover substantially the entirety of said surface;
    rotating said mold while heating said mold, wherein said polymeric material is heated and distributed over said interior surface;
    loading said mold further with a silane-doped thermoplastic resin while said mold is at a temperature sufficient to melt said resin, wherein rotation of said mold is continued in a manner such that said silane-doped resin is distributed over at least a portion of said polymeric material, said silane-doped resin forming an inner layer over said portion of said polymeric material;
    cooling said molded polymeric article; and
    bonding a foam material to said inner layer comprised of said silane-doped thermoplastic resin to form a polymeric and foam article.

19. A method as defined in claim 18, wherein said silane-doped thermoplastic resin is loaded into said mold prior to said polymeric material, said silane-doped thermoplastic resin thereby forming an outer layer over at least a portion of said polymeric material, said foam material being bonded to said outer layer.

20. A method as defined in claim 18, wherein said silane-doped thermoplastic resin and said polymeric material are comprised of homopolymers and copolymers of polyolefins.

21. A method as defined in claim 20, wherein said silane-doped thermoplastic resin and said polymeric material are comprised of polyolefins.

22. A method as defined in claim 18, wherein said foam material is a polyurethane foam.

23. A method as defined in claim 22, wherein said polyurethane foam is simultaneously formed and bonded to said inner layer comprised of said silane-doped thermoplastic resin, said polyurethane foam being formed by combining a polyol with an isocyanate.

24. A method as defined in claim 18, wherein said thermoplastic resin is doped with said silane by washing said thermoplastic resin in a silane solution and then evaporating said silane solution from said thermoplastic resin for depositing said silane upon said resin.

25. A method as defined in claim 24, wherein said silane has the following formula:

wherein R is an organofunctional group and X is an alkoxy group.

26. A method of making polymeric and foam articles, said method comprising the steps of:
    doping a thermoplastic resin with a silane;
    heating said silane-doped thermoplastic resin to a temperature sufficient to melt said resin but at a temperature insufficient to degrade said resin;
    incorporating the silane-doped thermoplastic resin into a polymeric article such that said article has at least one surface comprised of said silane-doped thermoplastic resin; and
    bonding a polyurethane foam to said at least one surface of said polymeric article, said polyurethane foam being formed directly on said at least one surface by combining and reacting a polyol with an isocyanate, wherein, during formation of said polyurethane foam, said foam bonds with said silane present at said at least one surface.

27. A method as defined in claim 26, wherein said thermoplastic resin is doped with said silane by washing said thermoplastic resin in a silane solution and then drying said thermoplastic resin to evaporate said solution.

28. A method as defined in claim 27, wherein said silane solution comprises from about 0.1% to about 20% silane.

29. A method as defined in claim 26, wherein said polymeric article is formed by loading a polymeric material into a mold, heating said mold and rotating said mold to distribute said polymeric material within said mold, wherein said silane-doped thermoplastic resin is added to said mold in a manner such that said polymeric article has at least one exterior surface comprised of said silane-doped thermoplastic resin.

30. A method as defined in 26, wherein said polyol and said isocyanate are mixed with air and sprayed onto said polymeric article.

31. A method as defined in claim 26, wherein said thermoplastic resin comprises polyethylene.

* * * * *